United States Patent
Choe

(10) Patent No.: US 9,615,123 B2
(45) Date of Patent: Apr. 4, 2017

(54) VIDEO PLAYING DEVICE, METHOD OF CONTROLLING THE VIDEO PLAYING DEVICE, AND VIDEO PLAYING SYSTEM

(71) Applicant: SAMSUNG ELECTRONICS CO., LTD., Suwon-si (KR)

(72) Inventor: Yong Jun Choe, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/788,904

(22) Filed: Jul. 1, 2015

(65) Prior Publication Data
US 2016/0100210 A1    Apr. 7, 2016

(30) Foreign Application Priority Data
Oct. 2, 2014   (KR) .................. 10-2014-0133413

(51) Int. Cl.
| | |
|---|---|
| H04N 9/80 | (2006.01) |
| H04N 21/43 | (2011.01) |
| H04N 21/431 | (2011.01) |
| H04N 21/47 | (2011.01) |
| H04N 21/41 | (2011.01) |
| H04N 21/422 | (2011.01) |
| H04N 21/488 | (2011.01) |

(52) U.S. Cl.
CPC ..... *H04N 21/4307* (2013.01); *H04N 21/4126* (2013.01); *H04N 21/42224* (2013.01); *H04N 21/431* (2013.01); *H04N 21/4302* (2013.01); *H04N 21/47* (2013.01); *H04N 21/4884* (2013.01)

(58) Field of Classification Search
CPC .................. H04N 21/4307; H04N 21/4126
USPC .................. 386/230, 234, 241, 244, 283
See application file for complete search history.

(56) References Cited

U.S. PATENT DOCUMENTS

| | | | |
|---|---|---|---|
| 8,761,568 B2* | 6/2014 | Ergin ................. | H04N 5/445 386/207 |
| 9,167,187 B2* | 10/2015 | Dourado .............. | H04N 5/44 |
| 2005/0152683 A1* | 7/2005 | Ryu ..................... | G11B 27/007 386/230 |
| 2006/0044479 A1* | 3/2006 | Heo .................... | H04N 5/445 348/738 |

(Continued)

FOREIGN PATENT DOCUMENTS

| | | |
|---|---|---|
| EP | 1536426 A1 | 6/2005 |
| EP | 1804495 A1 | 7/2007 |

OTHER PUBLICATIONS

Communication dated Mar. 7, 2016, issued by the European Patent Office in counterpart European Application No. 15179346.0.

(Continued)

*Primary Examiner* — Thai Tran
*Assistant Examiner* — Mishawn Hunter
(74) *Attorney, Agent, or Firm* — Sughrue Mion, PLLC

(57) ABSTRACT

A video playing device, a method of controlling the video playing device, and a video playing system are provided. The video playing device includes a display configured to display a video and a caption, and a controller configured to set a synchronization period in which the video is repeatedly played, and to synchronize a time point of displaying the caption with the video during the synchronization period.

20 Claims, 14 Drawing Sheets

(56) References Cited

U.S. PATENT DOCUMENTS

| | | | |
|---|---|---|---|
| 2009/0010609 A1* | 1/2009 | Hsieh | G11B 27/10 386/283 |
| 2011/0170839 A1 | 7/2011 | Adolph et al. | |
| 2011/0286715 A1 | 11/2011 | Zhang et al. | |
| 2014/0003792 A1* | 1/2014 | Soroushian | H04N 9/8238 386/244 |

OTHER PUBLICATIONS

Anonymous: "Gnome Subtitles Video subtitling for the GNOME desktop", Mar. 30, 2013, XP055253110, Retrieved from the Internet: URL: http://gnome-subtitles.sourceforge.net/ (6 pages total).
Communication dated Dec. 9, 2016, issued by the European Patent Office in counterpart European Patent Application No. 15179346.0.

* cited by examiner (a) BASIC SETTING (b) SHIFT INTERVAL (c) SHIFT DIRECTION (FORWARD DIRECTION)

(d) SHIFT DIRECTION (REVERSE DIRECTION)

VIDEO PLAYING DEVICE, METHOD OF CONTROLLING THE VIDEO PLAYING DEVICE, AND VIDEO PLAYING SYSTEM

CROSS-REFERENCE TO RELATED APPLICATION

This application claims priority from Korean Patent Application No. 10-2014-0133413, filed on Oct. 2, 2014 in the Korean Intellectual Property Office, the disclosure of which is incorporated herein by reference in its entirety.

BACKGROUND

1. Field

Apparatuses, methods and systems consistent with exemplary embodiments relate to a video playing device, a method of controlling the video playing device, and a video playing system.

2. Description of the Related Art

Various video playing devices having video playing capabilities, such as a portable terminal, an MP3 player, an electric dictionary, a game console, and/or the like rapidly display image frames to play video. Here, the video playing device may display the video together with a caption that is manually set by a user or automatically set by a video playing device.

While the above video playing device displays the caption, a user manually controls a time point at which the caption is displayed, and the video is continuously played while the user controls the time point at which the caption is displayed, and thus, it is difficult for the user to precisely synchronize the caption with the video.

SUMMARY

Exemplary embodiments provide a video playing device capable of synchronizing a caption with a video while the video is played during a synchronization period by separately setting the synchronization period for performing synchronization of the caption and the video, a method of controlling the video playing device, and a video playing system.

In accordance with an aspect of an exemplary embodiment, there is provided a video playing device including a display configured to display a video and a caption; and a controller configured to set a synchronization period in which the video is repeatedly played, and to synchronize a display time point of the caption with the video during the synchronization period.

The video playing device may further include an input unit configured to receive an input of a user, and the controller may set the synchronization period based on the input of the user.

The video playing device may further include an input unit configured to receive an input of a user, and the controller may shift the synchronization period based on the input of the user.

The video playing device may further include an input unit configured to receive at least one of a shift interval and a shift direction of the synchronization period.

The controller may shift the synchronization period so that an image frame requiring a caption is present in the synchronization period.

When an image frame requiring a caption is present in the synchronization period, the controller may repeatedly play the video in the synchronization period, and when an image frame requiring a caption is not present in the synchronization period, the control unit may shift the synchronization period by a preset shift interval.

The video playing device may further include an input unit configured to receive the display time point of the caption, and the controller may control the display unit so that the caption may be displayed at the display time point of the caption.

The video playing device may further include a storage configured to store the display time point of the caption.

The video playing device may further include an input unit configured to receive at least one of a shift interval and a shift direction of the caption.

When the control of the display time point of the caption is completed, the controller may play the video from a preset time point.

In accordance with another aspect of an exemplary embodiment, a method of controlling a video playing device includes displaying a video and a caption; setting a synchronization period in which the video is repeatedly played; and synchronizing a display time point of the caption with the video during the synchronization period.

Before the synchronizing, the method of controlling the video playing device may further include determining the presence of an image frame requiring a caption in the synchronization period; and shifting the synchronization period so that the image frame requiring the caption is present in the synchronization period.

The method of controlling the video playing device may further include displaying a caption synchronized with the display time point of the caption.

The method of controlling the video playing device may further include playing the video from a preset time point.

In accordance with an aspect of another exemplary embodiment, there is provided a video playing system including a video playing device configured to display a video and a caption; and a remote control device configured to receive at least one of a synchronization mode and a display time point of a caption from a user, and to control the video playing device, wherein when the video playing device receives the synchronization mode from the remote control device, the video playing device repeatedly plays the video in a set period.

The remote control device may include a remote controller.

The remote control device may include a portable terminal.

The remote control device may include a touch screen device.

BRIEF DESCRIPTION OF THE DRAWINGS

The above and/or other aspects will become apparent and more readily appreciated from the following description of exemplary embodiments, taken in conjunction with the accompanying drawings of which.

DETAILED DESCRIPTION

Figure 1:
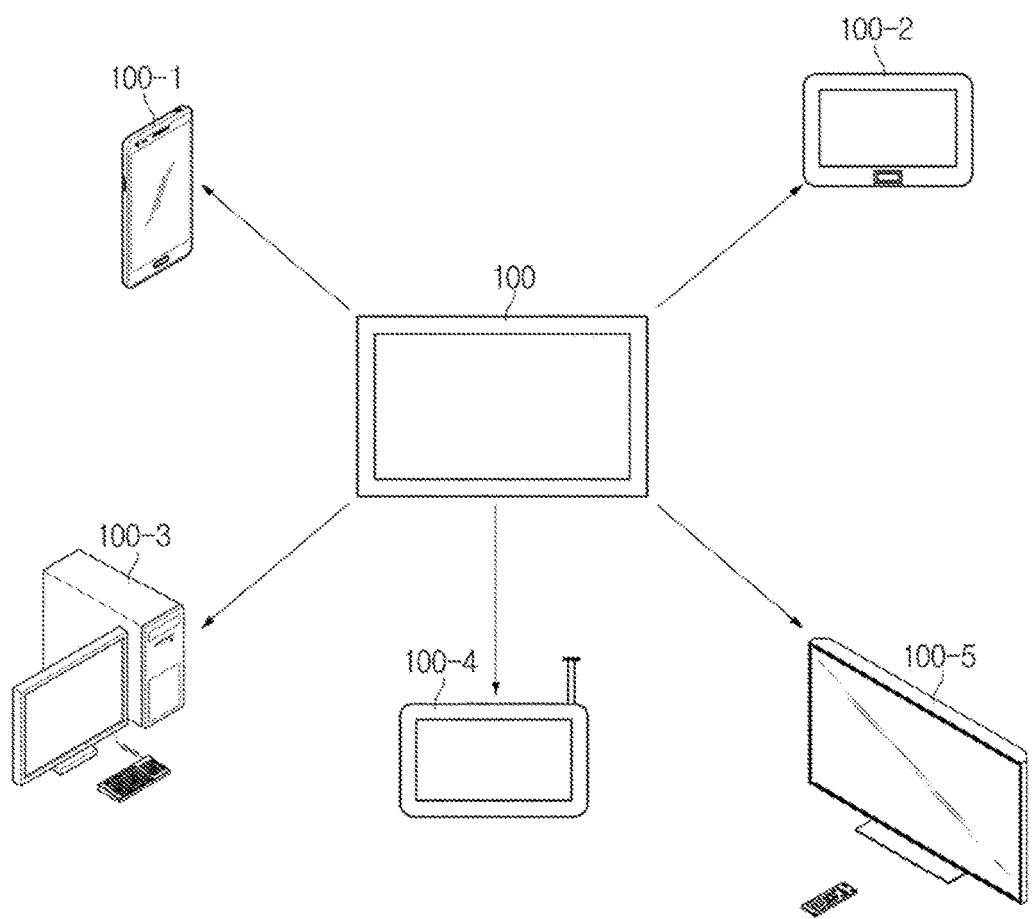
FIG. 1 is a view illustrating a video playing device according to an exemplary embodiment.

Hereinafter, exemplary embodiments will be more explicitly described in detail with reference to the accompanying drawings. It should be noted that in the reference numerals of the components of each drawing, like numerals can refer to like elements throughout the description of the figures although the reference numerals are displayed in different drawings. Also, in the explanation of the exemplary embodiments, a detailed description related to a well-known structures that may obscures the scope of the disclosure may be omitted. The terms "first," "second," etc. are used to distinguish one element from another, and these elements should not be limited by these terms.

Figure 2:
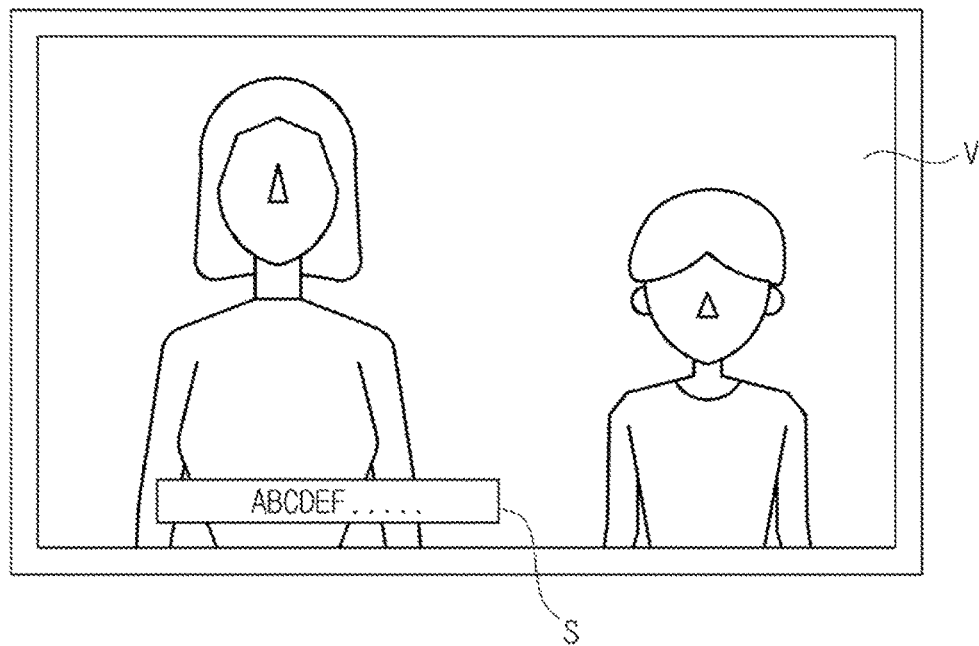
FIG. 2 is a view illustrating an exterior of the video playing device according to an exemplary embodiment.
Figure 3:
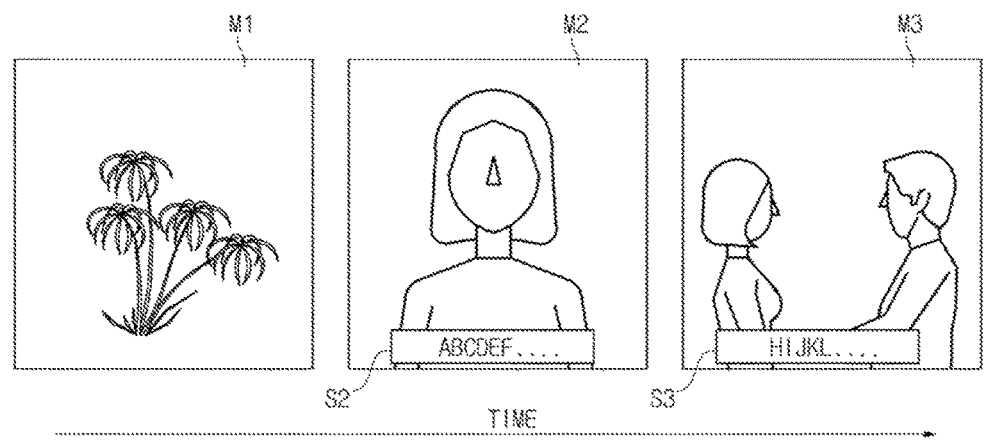
FIG. 3 is a view illustrating a process of chronologically displaying a video and a caption corresponding to the video according to an exemplary embodiment.

FIG. 1 is a view illustrating a video playing device according to an exemplary embodiment, and FIG. 2 is a view illustrating an exterior of the video playing device according to an exemplary embodiment, and FIG. 3 is a view illustrating a process of chronologically displaying a video and a caption corresponding to the video according to an exemplary embodiment.

Referring to FIG. 1, a video playing device 100 is a device configured to process image frames to play video based on input of a user or a setting of a program that is pre-stored, and may be implemented as computers 100-2 and 100-3, portable terminals 100-1 and 100-4, an analog or digital television (TV) 100-5, and/or the like.

The image frame refers to a still image included in the video.

The computer, for example, may include a notebook including a web browser, a desktop 100-3, a laptop, a tablet personal computer (PC) 100-2, a slate PC, a smart TV, and/or the like, and the portable terminals 100-1 and 100-4, for example, are devices that allow portability and mobility, and include all types of handheld based devices such as a personal communication system (PCS) terminal, a global system for mobile communications (GSM) terminal, a personal digital cellular (PDC) terminal, a personal handy phone system (PHS) terminal, a personal digital assistant (PDA), an international mobile telecommunication (IMT)-2000 terminal, a code division multiple access (CDMA)-2000 terminal, a wide code division multiple access (WCDMA) terminal, a wireless broadband Internet (WiBro) terminal, a portable multimedia player (PMP) terminal 100-4, a smart phone 100-1, and/or the like. The digital TV 100-5 includes a standard definition TV (SDTV) and a high definition TV (HDTV).

Also, the video playing device 100 may display a caption corresponding to a video as well as playing the video. Referring to FIG. 2, the video playing device 100 displays a caption S corresponding to a video V.

Here, a video V includes one or more image frames M1, M2, and M3 as illustrated in FIG. 3. Since captions S2 and S3 are displayed in all image frames M1, M2, and M3 that are provided to a user, the user may understand the content of each image frame M1, M2, and M3.

However, when the video V played through the video playing device 100 is not synchronized with the displayed caption S, the contents may not match the video in which the content of the caption S is displayed. The user may not clearly understand the contents to be transmitted from the video by the above mismatching between the video and the caption contents. Thus, an operation of synchronizing the time point of displaying the caption with playing video is required.

Figure 4:
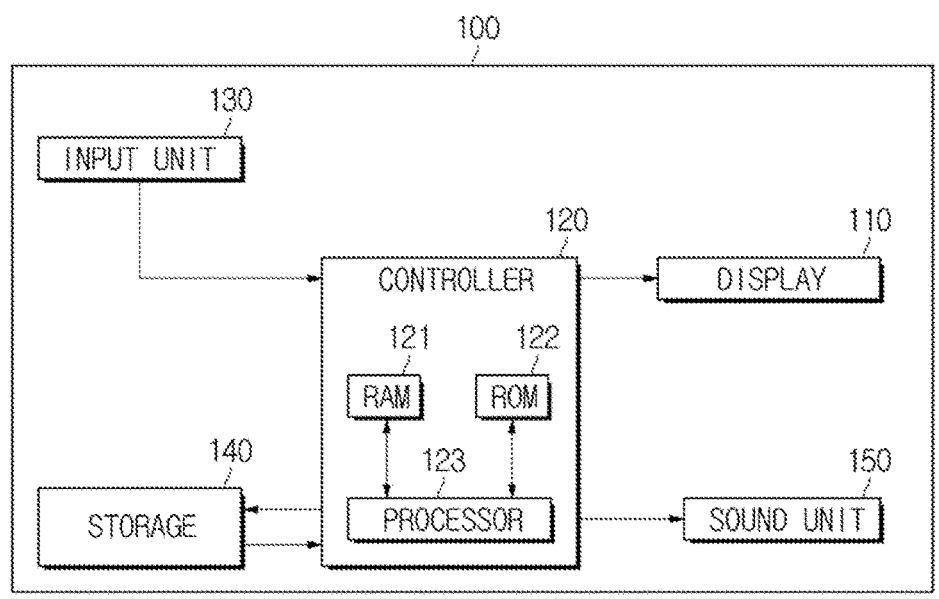
FIG. 4 is a block diagram illustrating a configuration of the video playing device according to an exemplary embodiment.

To this end, the video playing device 100 according to an exemplary embodiment may differently set the number of one or more image frames or a time period (hereinafter, referred to as a synchronization period) to perform synchronization, and thus, the user may control the display time point of the caption while the video is played during the synchronization period. FIG. 4 is a block diagram illustrating a configuration of the video playing device 100 according to an exemplary embodiment.

Referring to FIG. 4, the video playing device 100 includes a display 110 configured to display a video and a caption, a controller 120 configured to control components of the video playing device 100, an input unit 130 configured to receive a command for controlling the video playing device 100, a storage 140 configured to store various types of data based on a control of the video playing device 100, and a sound unit 150 configured to output a sound.

The display 110 displays the video including one or more image frames, and the caption corresponding to the video, which are played by the controller 120 described below.

Figure 5:
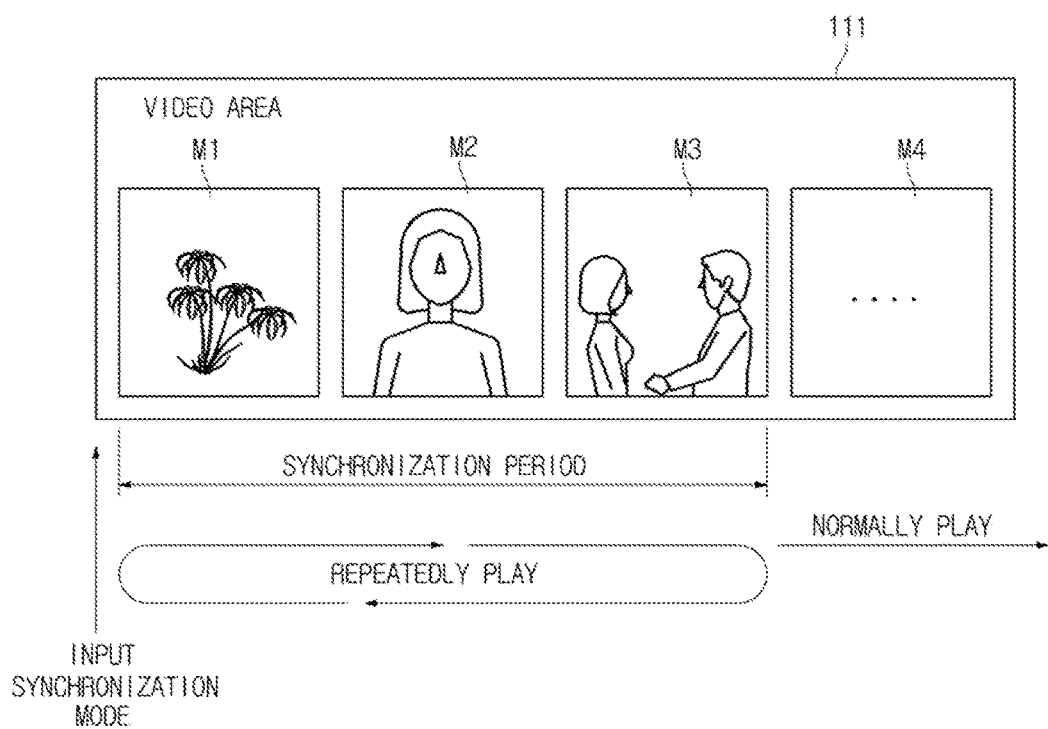
FIG. 5 is a view illustrating one or more image frames displayed by a display according to an exemplary embodiment.
Figure 6:
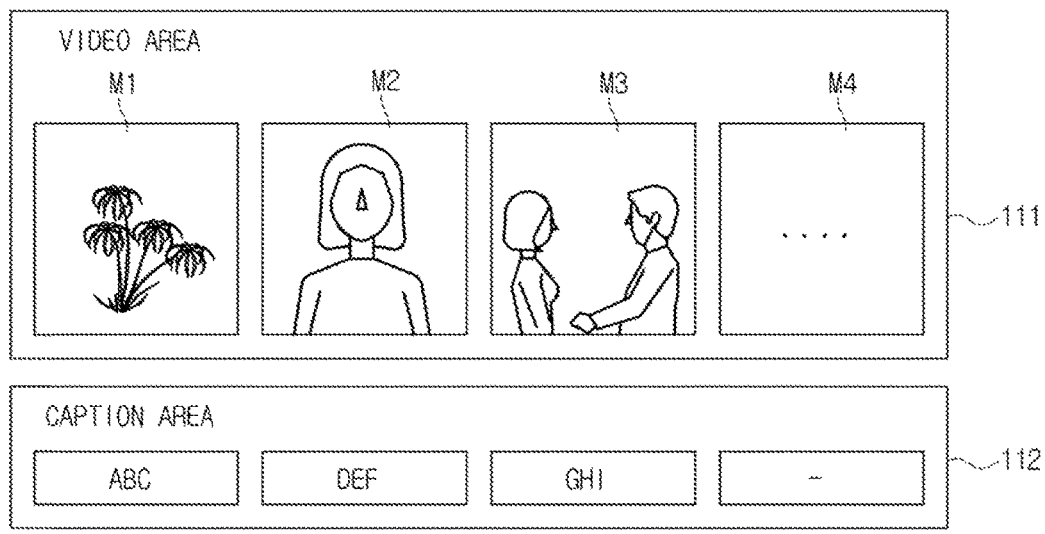
FIG. 6 is a view illustrating a caption displayed by the display according to an exemplary embodiment.

FIG. 5 is a view illustrating one or more image frames displayed by the display 110, and FIG. 6 is a view illustrating a caption displayed by the display 110 according to exemplary embodiments.

In particular, referring to FIG. 5, a video player 111 chronologically displays one or more image frames included in the video based on the control of the controller 120, and when the synchronization period is set based on the input of the user, the video player 111 displays an image frame repeatedly played under the control of the controller 120.

Also, when the synchronization of the display 110 is completed, one or more image frames are displayed again chronologically.

Also, referring to FIG. 6, the display 110 displays a caption corresponding to each image frame. The caption corresponding to the image frame, for example, may be directly selected by the user, or the controller 120 described below may set the caption by automatically searching and selecting a caption which has a file name identical to a file name of a video stored in the storage 140.

For example, when a caption corresponding to an image frame of the display 110 is displayed, an "ABC" caption is displayed at a time point at which an image frame M1 is displayed, and a "DEF" caption is displayed at a time point at which an image frame M2 is displayed, and a "GHI" caption is displayed at a time point at which an image frame M3 is displayed.

The display 110 may be implemented using a plasma display panel (PDP), a light emitting diode (LED), a liquid crystal display (LCD), and/or the like. Also, the display 110 may be a 3-dimensional display capable of displaying a stereoscopic image. The display 110 may include a touch screen device. When the display 110 includes the touch screen device, the display 110 may serve as the input unit 130 that will be described below. The touch screen device may be implemented using a pressure touch screen panel or an electrostatic touch screen. Also, the touch screen device may be implemented as a touch screen panel and may use ultrasound or infrared.

Referring again to FIG. 4, the controller 120 plays the video, and outputs a control signal configured to control each component included in the video playing device 100, and thus, controls overall operations of the video playing device 100.

In particular, the controller 120 may play a video based on a terrestrial broadcast signal or a broadcast data signal received through a wired and wireless network, or a video stored in a data area of the storage 140 described below.

The network may be implemented in all types of wired networks such as a local area network (LAN), a wide area network (WAN), a value added network (VAN), and/or the like or all types of wireless networks such as mobile radio communication network, a satellite communication network, and/or the like.

To this end, although not shown in the drawings, the video playing device 100 may further include a receiver (not shown) configured to receive the broadcast data signal. The receiver may include one or more of a wired communication module, a wireless communication module, and a LAN module.

Also, the controller 120 sets the synchronization period of the video and the caption in the video, and controls the display time point of the caption displayed by the display 110. Hereinafter, referring to FIGS. 7A and 7B, an operation of setting the synchronization period by the controller 120 will be described, and referring to FIG. 8, an operation of controlling the display time point of the caption by the controller 120 will be described.

Figure 7A:
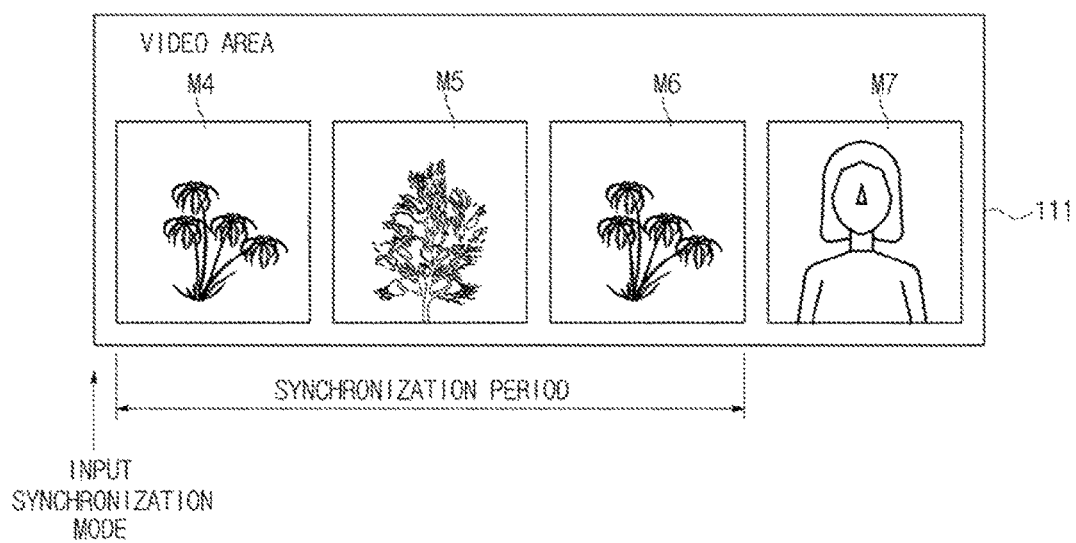
FIGS. 7A and 7B are views illustrating an operation of setting a synchronization period by a controller according to an exemplary embodiment.
Figure 7B:
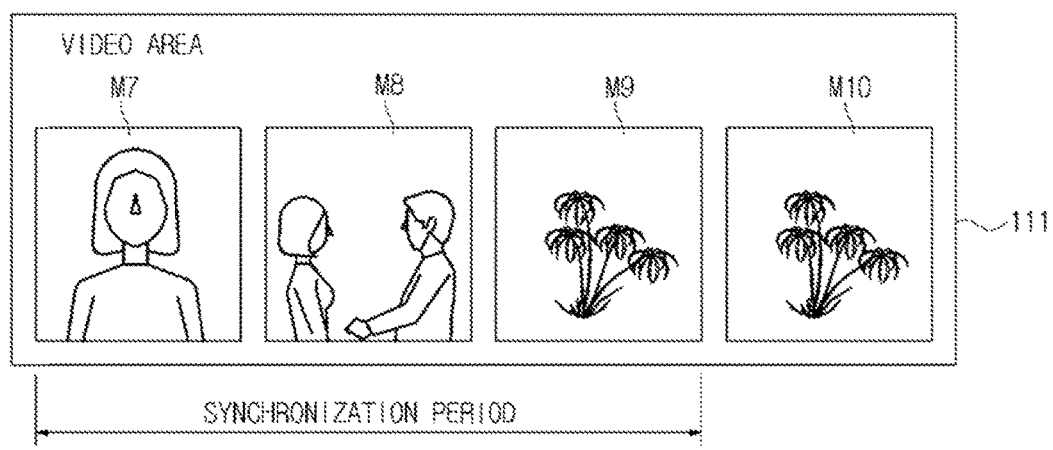
Figure 8:
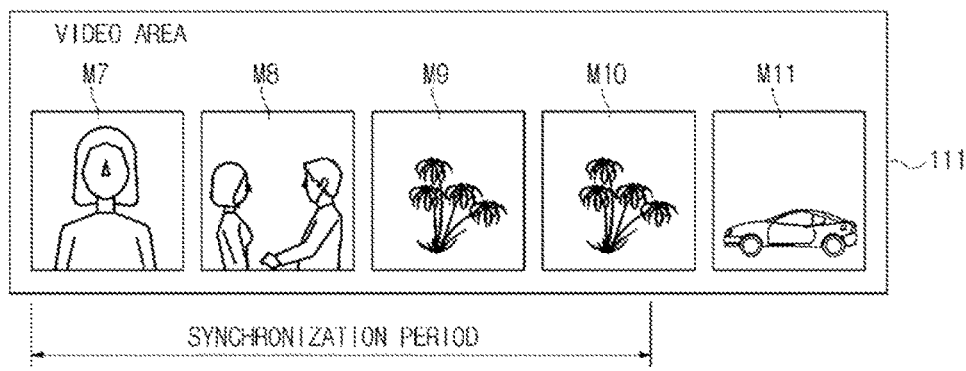
FIG. 8 is a view illustrating an operation of controlling a display time point of the caption by the controller according to an exemplary embodiment
Figure 8:
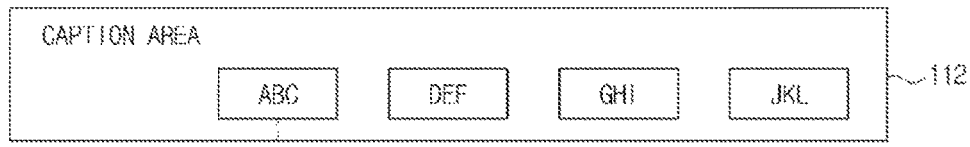
Figure 8:
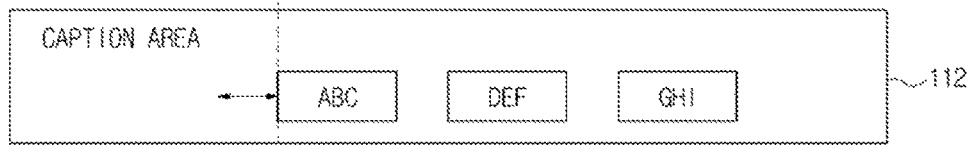
Figure 8:
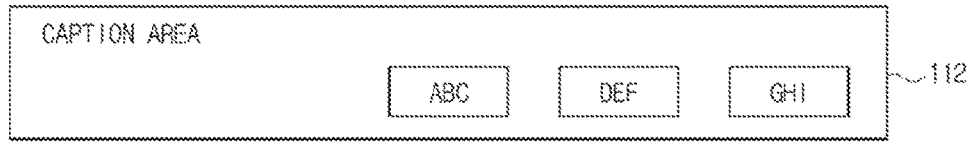
Figure 8:
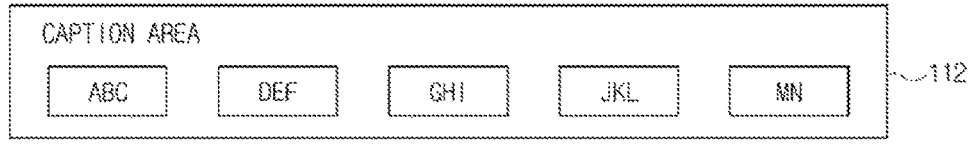

FIGS. 7A and 7B are views are illustrating an operation of setting a synchronization period by a controller 120 according to an exemplary embodiment, and FIG. 8 is a view illustrating an operation of controlling a display time point of the caption by the controller 120 according to an exemplary embodiment.

Referring to FIGS. 7A and 7B, the controller 120 sets the synchronization period based on a synchronization mode input by the user. The synchronization period may be the number of one or more image frames or a time period.

For example, the synchronization period may include a starting point and a length. The starting point of the synchronization period may be a point at which the user inputs the synchronization mode or a preset time point. The length of the synchronization period may be set as the number of preset image frames (for example, 1,000 frames) or a duration (for example, 17 seconds).

For example, as illustrated in FIG. 7A, when the starting point of the synchronization period is an input time point and the length of the synchronization period is preset as a length including 3 frames, the synchronization period is set as illustrated in FIG. 7A.

Then, the controller 120 repeatedly plays image frames M4, M5, and M6. Thus, image frames M4, M5, and M6 are repeatedly played in a loop.

Here, when the image frame required by the caption in the synchronization period is not present, the controller 120 may shift the synchronization period according to a user input or automatically. The image frame required by the caption, for example, may be an image frame including a voice, and the image frame including the voice may refer to an image frame including a narration in an image, a dialogue between characters, a monologue of a character, and/or the like.

For example, the user may watch one or more image frames M4, M5, and M6 in the synchronization period played by the controller 120, and determine the nonpresence of a voice in the image frames M4, M5, and M6 and input a command to shift the synchronization period in a forward direction. Here, the controller 120 may shift the synchronization period in the forward direction based on the input of the user as illustrated in FIG. 7B, and the synchronization period shifted in the forward direction includes the image frames M7, M8, and M9.

Also, the user may input a command to shift the synchronization period in a reverse direction, or a shift interval setting command of the synchronization period as well as the command to shift the synchronization period in the forward direction. Here, the controller 120 may shift the synchronization period in the reverse direction, or adjust the synchronization shift interval based on the input of the user, which will be described below with reference to FIG. 9.

Meanwhile, the controller 120 may shift the synchronization period based on the input of the user, and automatically and directly determine the presence of the image requiring the caption in the synchronization period to shift the synchronization period to a period in which the image requiring the caption is present or set the shift interval of the synchronization period.

Also, referring to FIG. 8, the controller 120 may control the display time point of the caption displayed in a caption area 112 of the display 110. The controller 120 may control the display time point of the caption while the video is played, and also control the display time point of the caption while the video is not played.

Also, in order to control the display time point of the caption based on the input of the user or automatically, the controller 120 may shift the caption or set the shift interval.

For example, the user may watch one or more image frames M7, M8, and M9 in the synchronization period, and as illustrated in FIG. 8(A) recognize the displaying of the caption as being faster than the image frames M7, M8, and M9, and input the shift direction of the caption, and the shift interval of the caption. Here, the controller 120 may shift the caption based on the forward shift input of the user as illustrated in FIG. 8(C), or shift the caption based on the reverse shift input as illustrated in FIG. 8(B), or set the shift interval of the caption by the time input as illustrated in FIG. 8(A). However, the shift and setting of the caption by the controller 120 is not limited to the input of the user but may be performed using various methods.

Also, when the control of the display time point of the caption is completed, the controller 120 plays the caption from the pre-set time point. Here, the preset time point, for example, may be a time point shifted from a current time point by about 10 seconds in the forward direction.

Referring again to FIG. 4, the controller 120 may include a processor 123, a read only memory (ROM) 122, in which a control program configured to control the video playing device 100 is stored, and a random access memory (RAM)

121 configured to store a signal or data input from the outside of the video playing device 100 or used as a storage corresponding to various operations performed in the video playing device 100.

Also, the controller 120 may include a graphic processing board (not shown) including the processor 123, the RAM 121, or the ROM 122 on a separate circuit board electrically connected to the control unit 120. The processor 123, the RAM 121, and the ROM 122 may be connected to each other through an internal bus.

Also, the controller 120 may be referred to as a component that includes the processor 123, the ROM 122, and the RAM 121. The controller 120 may be referred to as a component that includes the processor 123, the ROM 122, the RAM 121, and a processing board (not shown).

Figure 9:
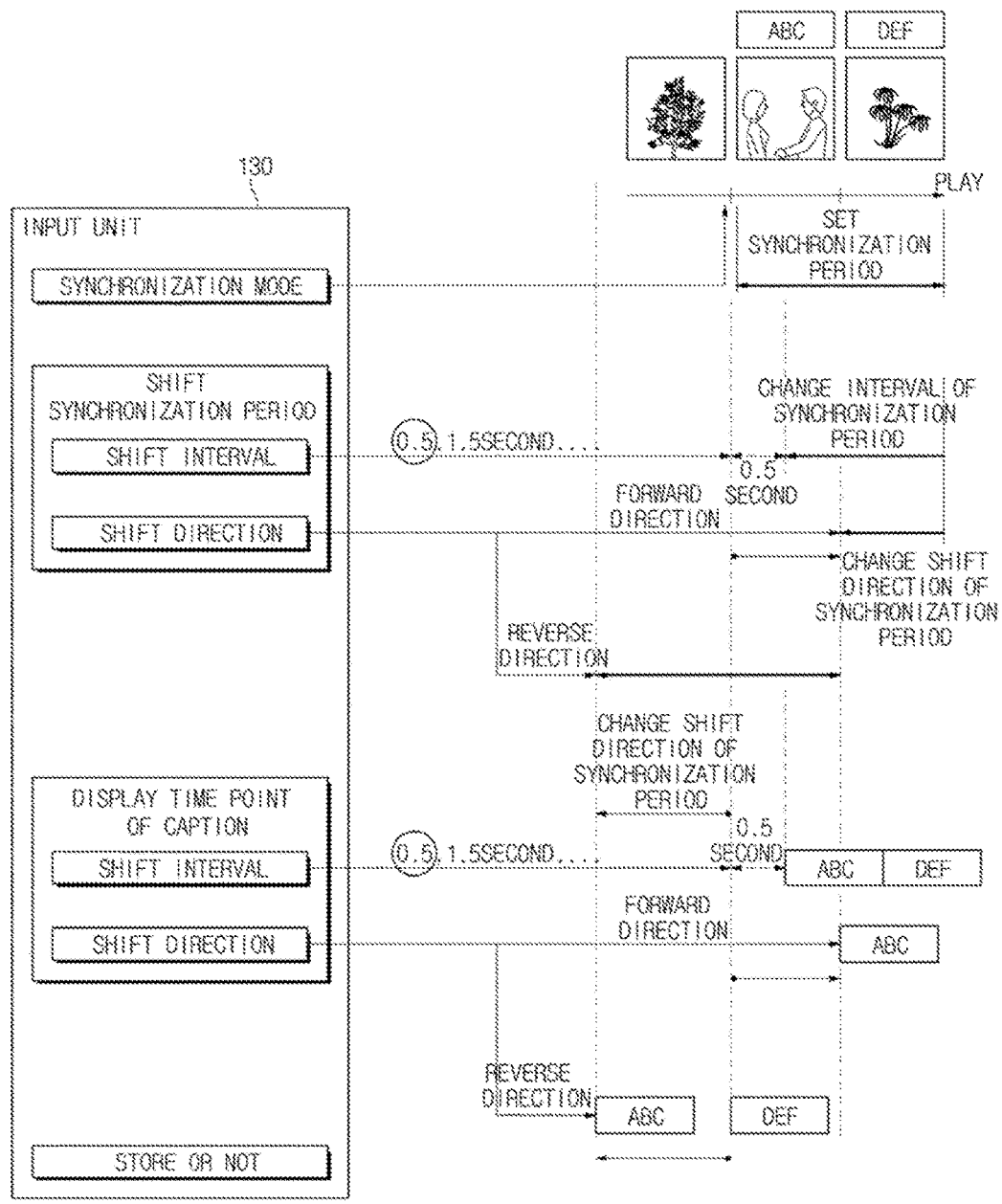
FIG. 9 is a view illustrating an example of information input through an input unit according to an exemplary embodiment.

The input unit 130 receives input of the synchronization mode, whether or not to shift the synchronization period, and the display time point of the caption from the user. Hereinafter, referring to FIG. 9, an operation performed by the video playing device 100 based on the input of the input unit 130 will be described. FIG. 9 is a view illustrating an example of information input from the input unit 130.

Referring to FIG. 9, the input unit 130 may receive the input of the synchronization period from the user. Here, the controller 120 sets the synchronization period based on the input of the user, and repeatedly plays one or more image frames existing in the synchronization period.

Then, the input unit 130 may receive the input of whether or not to shift the synchronization period from the user. Here, whether or not to shift the synchronization period includes the shift interval of the synchronization period and the shift direction of the synchronization period.

For example, when the user inputs 0.5 seconds as the shift interval of the synchronization period through the input unit 130, the controller 120 sets the shift interval of the synchronization period as 0.5 seconds, and thus, the synchronization period is shifted by 0.5 seconds in the reverse or forward direction. The shift interval is not limited to 0.5 seconds, but may be selected from a plurality of preset values such as 1 second, 1.5 seconds, and/or the like, and may be a value directly input by the input unit 130.

Also, when the user inputs the forward direction as the shift direction of the synchronization period through the input unit 130, the controller 120 forwardly shifts the synchronization period by the preset shift interval in the forward direction. When the preset shift interval is 1 second, the controller 120 forwardly shifts the synchronization period by 1 second based on the forward direction input, and when the preset shift interval is 0.5 seconds, the controller 120 forwardly shifts the synchronization period by 0.5 seconds based on the forward direction input.

Also, when the user inputs the reverse direction as the shift direction of the synchronization period through the input unit 130, the controller 120 reversely shifts the synchronization period by the preset shift interval in the reverse direction. When the preset shift interval is 1 second, the controller 120 reversely shifts the synchronization period by 1 second based on the reverse direction input, and when the preset shift interval is 0.5 seconds, the controller 120 reversely shifts the synchronization period by 0.5 seconds based on the reverse direction input.

Then, when the synchronization period is set, the input unit 130 may receive the display time point of the caption from the user. Here, the display time point of the caption includes inputs of the shift interval of the caption and the shift direction.

For example, when the user inputs 0.5 seconds as the shift interval of the caption through the input unit 130, the controller 120 sets the shift interval of the caption as 0.5 seconds, and thus, the display time point of the caption may be shifted by 0.5 seconds in the reverse or forward direction. The shift interval is not limited to 0.5 seconds, but may be selected from a plurality of preset values such as 1 second, 1.5 seconds, and/or the like, or may be a value directly input through the input unit 130.

Also, when the user inputs the forward direction as the shift direction of the caption through the input unit 130, the controller 120 shifts the caption forward by the preset shift interval. When the preset shift interval is 1 second, the controller 120 shifts the caption forward by 1 second from the current display time point based on the forward direction input, and when the preset shift interval is 0.5 seconds, the controller 120 shifts the caption forward by 0.5 seconds from the current display time point based on the forward direction input.

Also, when the user inputs the reverse direction as the shift direction of the caption through the input unit 130, the controller 120 shifts the caption in the reverse direction by the preset shift interval. When the preset shift interval is 1 second, the controller 120 reversely shifts the caption by 1 second from the current display time point based on the reverse direction input, and when the preset shift interval is 0.5 seconds, the controller 120 reversely shifts the caption by 0.5 second from the current display time point based on the reverse direction input.

Then, the input unit 130 may receive input of whether or not to store the current display time point of the caption. When the input unit 130 receives the storage command, the current display time point of the caption preset by the controller 120 may be stored in the storage 140, which will be described.

Also, the input unit 130 may input various control commands (for example, play or stop the video) to the video playing device 100 from the user, and may include a plurality of screens, and thus, the user may input the control command while the user watches the display 110.

Referring again to FIG. 4, the storage 140 is configured to store a program and data related to the video playing device 100, and may mainly include a program area and a data area, and the program area may store a program related to a functional operation of the video playing device 100, and the data area may store data generated by the use of the video playing device 100 such as video data, caption data, the display time point of the caption, the starting point of the synchronization period, the length of the synchronization period, and/or the like.

Meanwhile, in FIG. 4, the controller 120 may include the ROM 122 configured to store the control program for controlling the video playing device 100 and the RAM 121 configured to store the signal or data input from the outside of the video playing device 100 and used as a storage corresponding to various operations performed in the video playing device 100. On the other hand, the storage 140 may include the RAM and the ROM, and the above described storage 140 may be included in the video playing device 100, and may be implemented as a portable device in a form to be inserted in the video playing device 100.

Also, the storage 140, as illustrated in FIG. 4, may be implemented as a separate configuration from the control unit 120. Alternatively, the storage 140 may be implemented in the control 120. Here, the storage 140 may be implemented to be integrated with other components on any one substrate or included in the controller 120.

The sound unit 150 is a component configured to output a sound included in the video, and may be implemented as a speaker and/or an amplifier. The sound may include voice sounds used in the actual pronunciations of words and sounds other than voice sounds. The image frame requiring the above described caption may include an image frame including the voice sounds.

The display 110 and the sound unit 150 may be connected to the other components included in the video playing device 100 through a cable or a network, but may be provided separately from the video playing device 100.

According to another exemplary embodiment, the input unit 130 of the video playing device 100 may be implemented as a separate device separated from the video playing device 100, and in this case, the input unit 130 may externally receive a control signal for controlling the video playing device 100 through a wired or wireless network.

A device separated from the video playing device 100 and configured to transmit the control signal for controlling the video playing device 100 from the outside may be referred to as a remote control device according to an exemplary embodiment.

Figure 10:
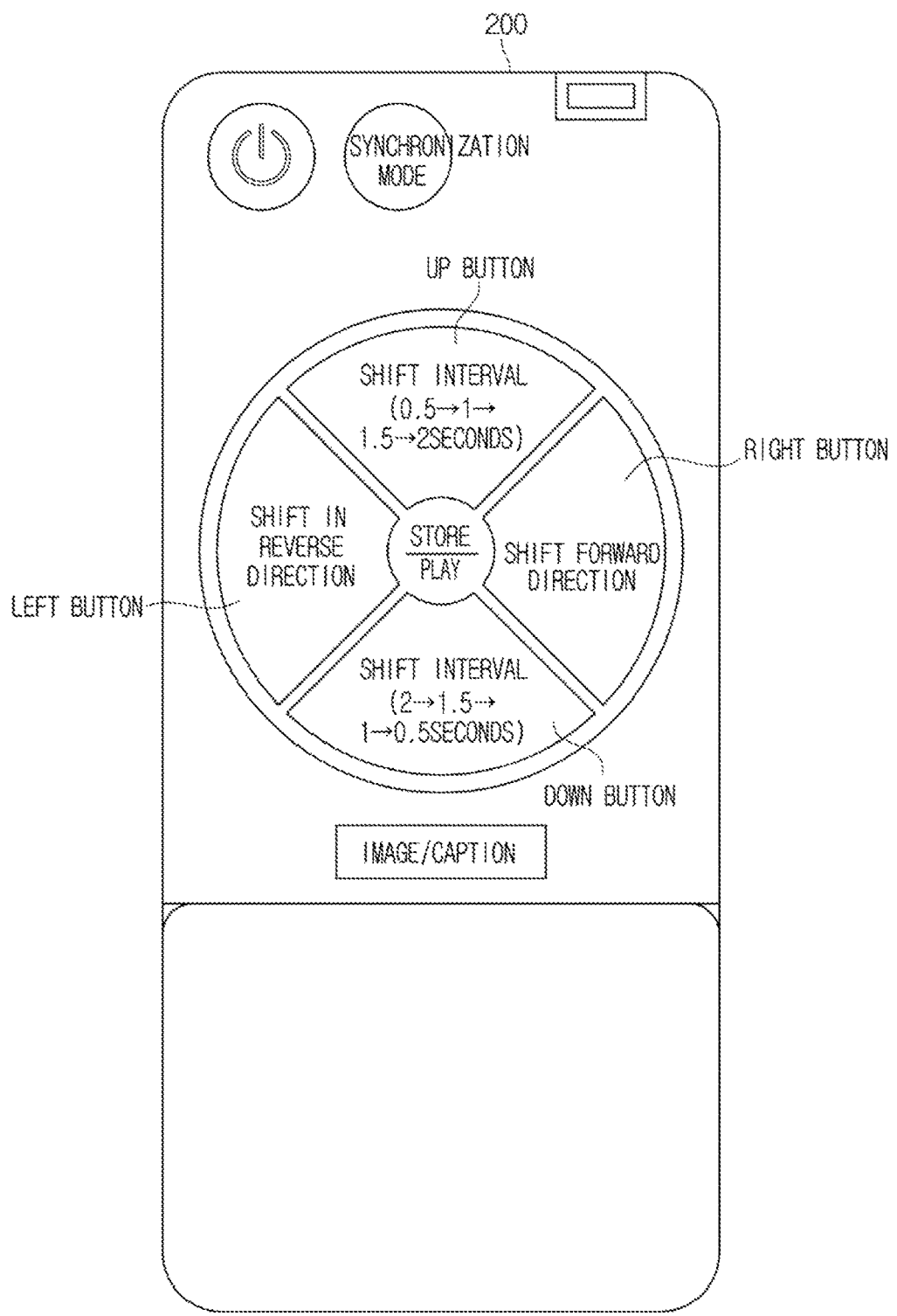
FIG. 10 is a view illustrating an exterior of a remote control device according to an exemplary embodiment.
Figure 11:
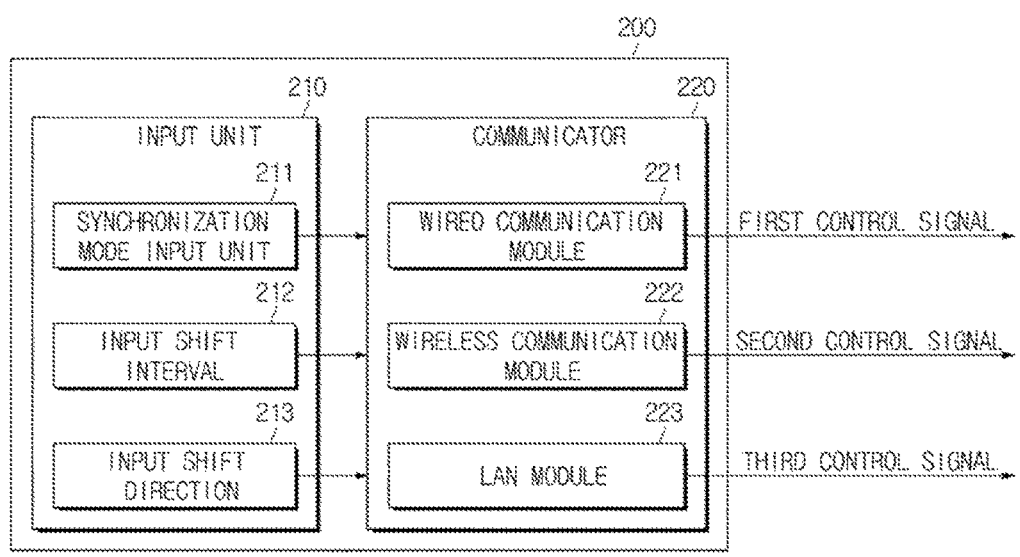
FIG. 11 is a configuration block diagram illustrating the remote control device according to an exemplary embodiment.
Figure 12:
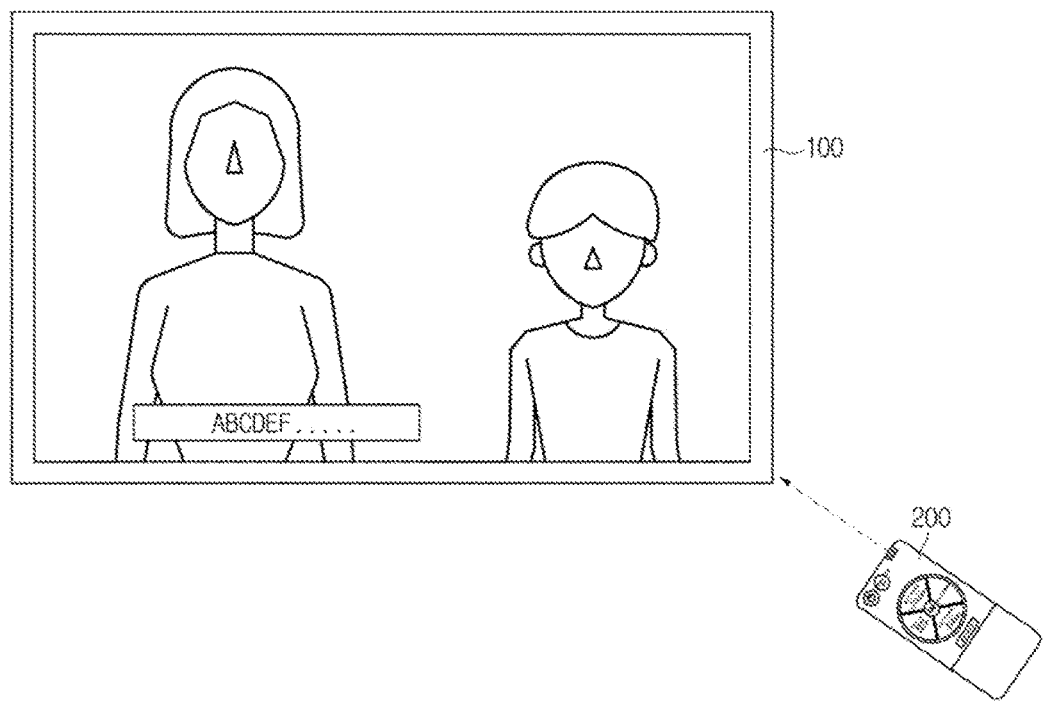
FIG. 12 is a view illustrating a process of transmitting a control signal from the remote control device to a video playing device according to an exemplary embodiment.

FIG. 10 is a view illustrating an exterior of a remote control device according to an exemplary embodiment, and FIG. 11 is a configuration block diagram illustrating the remote control device according to an exemplary embodiment, and FIG. 12 is a view illustrating a process of transmitting a control signal from the remote control device to the video playing device 100 according to an exemplary embodiment.

Referring to FIGS. 10 and 11, a remote control device 200 according to an exemplary embodiment may be implemented as a remote controller type, and includes an input unit 210 disposed outside thereof and having a pressure power button, a synchronization mode button, an up/down button, a left/right button, and an image/caption button, and a case, and a communicator 220 disposed therein. On the other hand, the communicator 220 may be disposed outside thereof. Also, the input unit 210 is divided into a synchronization mode input unit 211, a shift interval input unit 212, and a shift direction input unit 213, which are divided according to operation.

In particular, the input unit 210 may include the synchronization mode input unit 211 configured to receive the input of the synchronization mode from the user, the shift interval input unit 212 configured to receive the shift interval of the synchronization period or the caption, and the shift direction input unit 213 configured to receive the shift direction of the synchronization period or the caption.

For example, when the synchronization mode input unit 211 is implemented as the "synchronization mode" button as illustrated in FIG. 10, since the user presses the synchronization mode button, the remote control device 200 transmits a first control signal to set the synchronization period to the video playing device 100.

Also, when the shift interval input unit 212 is implemented as the "up button and down button" as illustrated in FIG. 10, the user may press the up button to increase the shift interval of the synchronization period or the shift interval of the caption by a preset value, and the user may press the down button to decrease the shift interval of the synchronization period or the shift interval of the caption by a preset value.

For example, when the preset value is 0.5 seconds and the user presses the up button once, the shift interval of the synchronization period or the shift interval of the caption may be set as 0.5 second, and when the user presses the up button one more time, the shift interval of the synchronization period or the shift interval of the caption may be set as 1 second, and when the user presses the up button one more time, the shift interval of the synchronization period or the shift interval of the caption may be set as 1.5 seconds (0→0.5→1 second). Also, when the user presses the down button once, the shift interval of the synchronization period or the shift interval of the caption may be set as 1 second again, and when the user presses the down button one more time, the shift interval of the synchronization period or the shift interval of the caption may be set as 0.5 seconds, and when the user presses the down button one more time, the shift interval of the synchronization period or the shift interval of the caption may be set as 0 seconds (1→0.5→0 seconds).

Thus, when the shift interval input unit 212 is implemented as the up button or the down button, since the user presses the up button or the down button, the remote control device 200 transmits a second control signal, and thus, the video playing device 100 sets the shift interval of the synchronization period or the shift interval of the caption.

Also, when the shift direction input unit 213 is implemented as the left or right button as illustrated in FIG. 10, the user may press the right button to shift the synchronization period or the caption in the forward direction (→), and the user may press the left button to shift the synchronization period or the caption in the reverse direction (←). For example, when the user presses the right button, the synchronization period or the caption may be shifted forward by a preset synchronization period of the caption, and when the user presses the left button, the synchronization period or the caption may be shifted in the reverse direction by a preset synchronization period of the caption.

Thus, when the shift direction input unit 213 is implemented as the left button and the right button, since the user presses the left button or the right button, the remote control device 200 may transmit a third control signal, and thus, the video playing device 100 sets the shift direction of the synchronization period or the shift direction of the caption.

Meanwhile, the input unit 210 may receive an input from the user of whether or not to store the current display time point of the caption. For example, when the user presses the "storage button" as illustrated in FIG. 10 and the input unit 210 receives the storage command, the remote control device 200 may control an operation of storing the current display time point of the caption in the video playing device 100.

Also, the input unit 210 may include a button configured to allow input of various control commands (for example, playing video, stop playback, or whether or not to change image/caption) related to the video playing device 100 by the user.

Also, the input unit 210 is not limited to the button type inputs illustrated in FIG. 10, but may be implemented as a touch screen device or other type of interface. The touch screen device may be implemented using a pressure touch screen panel or an electrostatic touch screen panel. Also, the touch screen device may be implemented with a touch screen panel using ultrasound or infrared. Here, the user may directly input the shift interval and the shift direction of the synchronization period and the shift interval and the shift direction of the caption through the input unit 210, and thus, the synchronization period and the display time point of the caption may be controlled.

Referring again to FIG. 11, the communicator 220 transmits the aforementioned first, second, and third control signals to the video playing device 100 according to the input of the user through a network. The network may be implemented in all types of wired networks such as a LAN, a WAN, a VAN, and/or the like and all types of wireless networks such as mobile radio communication network, a satellite communication network, and/or the like.

To this end, the communicator 220 may include one of a wired communication module 221, a wireless communication module 222, and a LAN module 223, and a combination of the wired communication module 221, the wireless communication module 222, and the LAN module 223.

The wired communication module 221 may include a wired Ethernet, and the wireless communication module 222 may be connected to an access point (AP) using a wireless communication at a place in which an AP (not shown) is installed. The wireless communication module 222 supports a wireless LAN standard of the Institute of Electrical and Electronics Engineers (IEEE), IEEE802. 11X.

The LAN module 223 may be connected to the network through Bluetooth, Bluetooth low energy, infrared data association (IrDA), Wi-Fi, ultra-wideband (UWB), near field communication (NFC), Zigbee, and/or the like.

As described above, when the remote control device 200 transmits the control signal through the network, the video playing device 100 may further include a receiver (not shown) configured to receive the control signal, and the receiver may be implemented as a communication module corresponding to the communicator 220 of the remote control device 200.

For example, as illustrated in FIG. 10, when the remote control device 200 is implemented as the remote controller type including the buttons and the communicator 220 is implemented as the LAN module configured to support infrared communication, the user may select any one button of the remote control device 200 and control the video playing device 100 by remote control.

Meanwhile, according to another exemplary embodiment, the remote control device 200 is not limited to the remote controller type, but may be implemented as a portable terminal.

The portable terminal is a device that ensures portability and mobility, and includes all types of handheld based devices such as a PCS terminal, a GSM terminal, a PDC terminal, a PHS terminal, a PDA, an IMT-2000 terminal, a CDMA-2000 terminal, a WCDMA terminal, a WiBro terminal, a PMP terminal, a smart phone, a tablet PC, and/or the like.

When the remote control device 200 is implemented as the portable terminal, the remote control device 200 may further include a display and a controller (not shown).

The display may be implemented using a PDP, a LED, a LCD, and/or the like.

Also, the display may use a 3-dimensional display capable of displaying a stereoscopic image.

The display may include a touch screen device.

When the display includes the touch screen device, the display may perform an operation of the above-described input unit 210.

Here, the user may directly input the shift interval and the shift direction of the synchronization period, and the shift interval and the shift direction of the caption by keying numbers through the input unit 210, and thus, control the synchronization period and the display time point of the caption.

The touch screen device may be implemented using a pressure touch screen panel or an electrostatic touch screen panel. Also, the touch screen device may be implemented using a touch screen panel using ultrasound or infrared.

Here, the communicator 220 may transmit the first control signal, the second control signal, and the third control signal to the video playing device 100, and also be connected to an Internet network, and also receive a signal from the video playing device 100 through a network.

The communicator 220, as described above, may be connected to the Internet network or the video playing device 100 through the wired communication module 221, the wireless communication module 222, or the LAN module 223.

The controller controls overall operations of each component of the remote control device 200.

The controller may include a processor, a ROM in which a control program configured to control the remote control device 200 is stored, and a RAM configured to store a signal or data input from the outside of the remote control device 200 or used as a storage corresponding to various operations performed in the remote control device 200.

The controller may include a graphic processing board (not shown) including the processor, the RAM, or the ROM on a separate circuit board electrically connected to the control unit. The processor, the RAM, and the ROM may be connected to each other through an internal bus.

The controller may be a component including the processor, the ROM, and the RAM.

The controller may be a component including the processor, the ROM, the RAM, and a processing board (not shown).

According to still another exemplary embodiment, the video playing device 100 and the remote control device 200 may be implemented as one video playing system.

That is, the video playing system includes the above video playing device 100 and the remote control device 200.

Each component of the video playing device 100 and the remote control device 200 included in the video playing system is described above, and thus, any repetitive explanation will be omitted.

Figure 13:
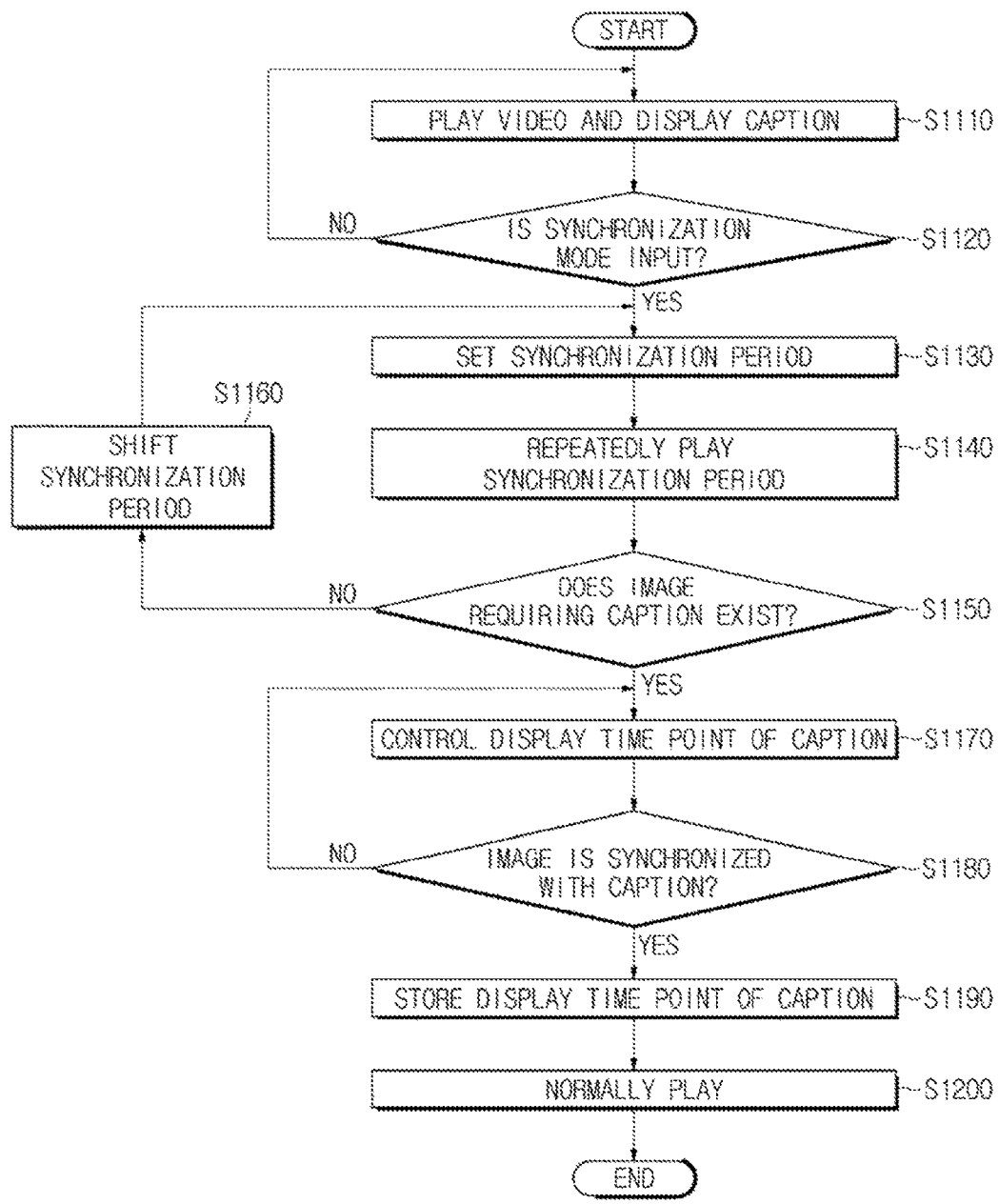
FIG. 13 is a flowchart illustrating a method of controlling a video playing device according to an exemplary embodiment.

Hereinafter, a method of controlling the video playing device 100 according to another exemplary embodiment will be described. FIG. 13 is a flowchart illustrating a method of controlling the video playing device 100.

First, the video playing device 100 plays a video, and displays a caption corresponding to the video (S1110). Here, a sound included in the video may be output through a sound unit 150. When a "synchronization mode" is input based on a user input ('Yes' of S1120), the video playing device 100 sets a synchronization period (S1130), and repeatedly plays one or more image frames in the synchronization period (S1140). A starting point of the synchronization period may be an input time point of the synchronization mode, and a length of the synchronization period may be preset as the number of the image frames or a playing time of the image frame.

Then, the video playing device 100 determines the presence of the image frame requiring the caption in the synchronization period (S1150), and when the image frame requiring the caption is not present in the synchronization period ('No' of S1150), the synchronization period is shifted by the input of the user or automatically (S1160). Here, the video playing device 100 may receive a shift direction and a shift interval of the synchronization period by the user, and thus, the synchronization period may be shifted or the shift interval of the synchronization period may be set. However, the presence of the image frame requiring the caption in the synchronization period (S1150) may be determined by the user and omitted.

When the image frame requiring the caption is present in the synchronizing period ('Yes' of S1150), the video playing device 100 controls a display time point of the caption (S1170). For example, since the video playing device 100 receives a shift direction and a shift interval of the caption from the user, the display time point of the caption may be controlled.

Then, when the image frame is synchronized with the caption ('Yes' of S1180), the video playing device 100 may store a current display time point of the caption based on the input of the user (S1190), and play the video again from a preset time point (S1200). The preset time point, for example, may be a time point shifted from the current time point by 10 seconds in a forward direction.

When the image frame is not synchronized with the caption ('No' of S1180), the video playing device 100 may continuously control the display time point of the caption (S1170). However, the user may determine whether or not to synchronize the above image frame and the caption (S1180).

As is apparent from the above description, in the video playing device, the method of controlling the video playing device, and the video playing system, in order to perform synchronization of the caption with the video, the synchronization period in which the video is repeatedly played is set, and thus, the user can easily control the display time point of the caption.

Also, according to the described video playing device, the method of controlling the video playing device, and the video playing system, because the user directly inputs the separate synchronization mode and the display time point of the caption, the user can precisely control the display time point of the caption during the synchronization period.

The description above is for illustrative purposes only. It will be understood by one of ordinary skill in the art that it is possible to easily modify the disclosure into other specific forms without deviating from the technical spirit of the exemplary embodiments. Therefore, the exemplary embodiments described above are to be understood as being non-limiting in every way. For example, each component that is described as integrated in an embodiment can be separated and, as the separated component, can serve to carry out the same function as in the integrated form.

The foregoing exemplary embodiments and advantages are merely exemplary and are not to be construed as limiting. The present teaching can be readily applied to other types of apparatuses. Also, the description of the exemplary embodiments of the present inventive concept is intended to be illustrative, and not limiting.

What is claimed is:

1. A video playing device comprising:
   a display configured to display a video and a caption; and
   a controller configured to set a synchronization period in which the video is repeatedly played, and to synchronize a display time point of the caption with the video during the synchronization period, and
   wherein the controller is configured to shift the synchronization period by a preset shift interval when an image frame requiring a caption is not present in the synchronization period.

2. The video playing device according to claim 1, further comprising an input unit configured to receive an input of a user,
   wherein the controller sets the synchronization period based on the input of the user.

3. The video playing device according to claim 1, further comprising an input unit configured to receive input of a user,
   wherein the controller shifts the synchronization period based on the input of the user.

4. The video playing device according to claim 1, further comprising an input unit configured to receive at least one of a shift interval and a shift direction of the synchronization period.

5. The video playing device according to claim 1, wherein the controller is configured to shift the synchronization period so that an image frame requiring a caption is present in the synchronization period.

6. The video playing device according to claim 1, wherein:
   the controller is configured to repeatedly play the video in the synchronization period when an image frame requiring a caption is present in the synchronization period.

7. The video playing device according to claim 1, further comprising an input unit configured to receive the display time point of the caption,
   wherein the controller is configured to control the display so that the caption is displayed at the display time point of the caption.

8. The video playing device according to claim 1, further comprising a storage configured to store the display time point of the caption.

9. The video playing device according to claim 1, further comprising an input unit configured to receive at least one of a shift interval and a shift direction of the caption.

10. The video playing device according to claim 1, wherein the controller is configured to play the video from a preset time point when the control of the display time point of the caption is completed.

11. The video playing device according to claim 1, wherein the controller is configured to set the synchronization period so that a specified portion of the video is repeatedly played and to synchronize the display time point of the caption while the specified portion of the video is repeatedly played.

12. A method of controlling a video playing device, the method comprising:
   displaying a video and a caption;
   setting a synchronization period in which the video is repeatedly played;
   synchronizing a display time point of the caption with the video during the synchronization period; and
   shifting the synchronization period by a preset shift interval when an image frame requiring a caption is not present in the synchronization period.

13. The method according to claim 12, further comprising, before the synchronizing, determining presence of an image frame requiring a caption in the synchronization period, and shifting the synchronization period so that the image frame requiring the caption is present in the synchronization period.

14. The method according to claim 12, further comprising displaying a caption synchronized with the display time point of the caption.

15. The method according to claim 12, further comprising playing the video from a preset time point.

16. The method according to claim 12, wherein the synchronization period is set so that a specified portion of the video is repeatedly played, and the display time point of the caption is synchronized while the specified portion of the video is repeatedly played.

17. A video playing system comprising:
   a video playing device configured to display a video and a caption; and a remote control device configured to receive at least one of a synchronization mode and a display time point of a caption from a user, and to control the video playing device, wherein the video playing device is configured to repeatedly play the video in a set period in response to receiving the synchronization mode from the remote control device, and wherein the video playing device is configured to shift the set period by a preset shift interval when an image frame requiring a caption is not present in the set period.

18. The video playing system according to claim 17, wherein the remote control device includes a remote controller.

19. The video playing system according to claim 17, wherein the remote control device includes a portable terminal.

20. The video playing system according to claim 17, wherein the remote control device includes a touch screen device.

\* \* \* \* \*